July 5, 1960

A. F. BOHNHOFF ET AL 2,943,510

TRANSMISSION CONTROL

Filed April 18, 1957

INVENTORS
Arthur F. Bohnhoff &
BY Stanley J. Sherl
W. C. Middleton
ATTORNEY

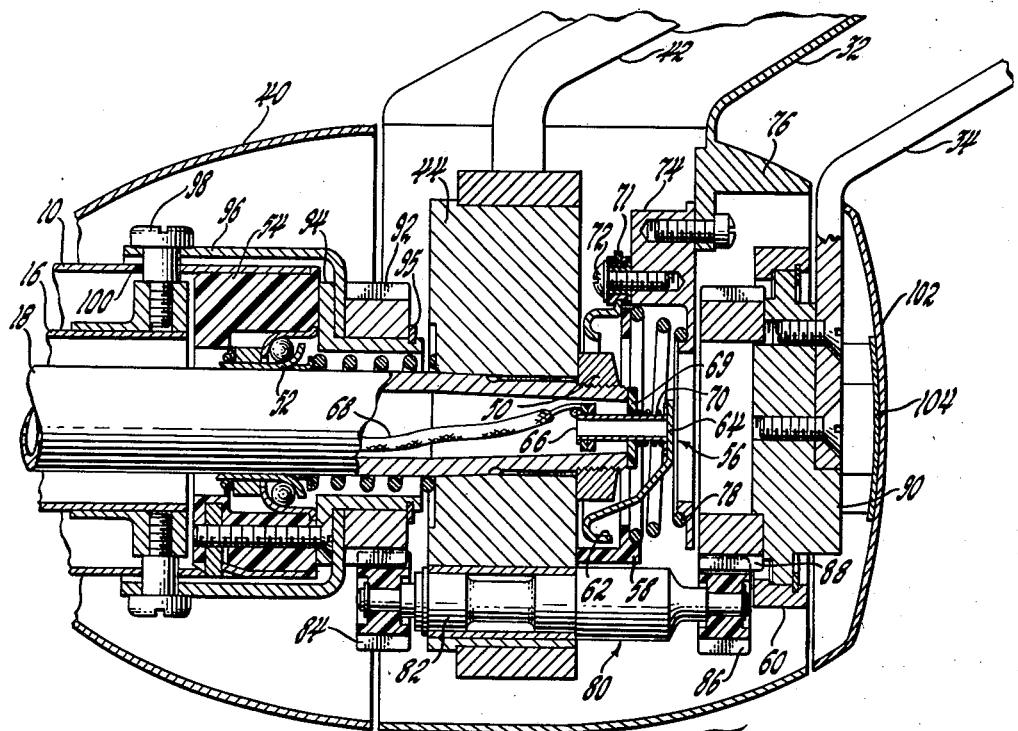

United States Patent Office 2,943,510
Patented July 5, 1960

2,943,510
TRANSMISSION CONTROL

Arthur F. Bohnhoff, Saginaw, Mich., and Stanley J. Skerl, Johnstown, Pa., assignors to General Motors Corporation, Detroit, Mich., a corporation of Delaware Filed Apr. 18, 1957, Ser. No. 653,611

7 Claims. (Cl. 74—485)

This invention relates to improvements in motor vehicle transmission controls and particularly to transmission controls adapted for installation on a steering column.

In motor vehicles, to render transmission manual control members, such as a steering column mounted selector lever, more accessible to the driver, it is advantageous to relocate the transmission control member from the usual position below the steering wheel hub to a position above. When the steering shaft is disposed within the transmission control shaft, there is a problem, without re-arranging the shafts, of connecting the control member and its associated shaft with the hub of the steering wheel in between. If the shafts are re-arranged so that the transmission control shaft is inside the steering shaft, then there is another problem of connecting the control shaft through the steering shaft to the transmission.

With the foregoing in mind, it is now proposed in a steering column construction in which a transmission control member is positioned above a hub portion of a steering wheel to provide a novel interconnection, through the steering wheel, of the transmission control member and a transmission control shaft. Specificially, the transmission control shaft and the transmission control member are intergeared in a unique way through the steering wheel to permit independent movement of both the transmission control member and the steering wheel.

According to one embodiment of the invention in which a steering shaft and a transmission control shaft are rotatably supported in a steering column, a transmission control member is disposed above a hub portion of the steering wheel and intergeared, preferably, by planetary gearing with the transmission control shaft through the steering wheel. The hub of the steering wheel becomes the carrier for the planetary gearing, thus enabling the steering shaft to be positioned inside the transmission control shaft. Both the steering wheel and transmission control member are operated in a conventional manner without one interfering with the operation of the other.

The foregoing and other objects and advantages will be more apparent from the following description and from the accompanying drawings, in which;

Figure 3 is a sectional view along line 3—3 of Figure 1;

Figure 4 is a sectional view similar to Figure 3 along line 4—4 of Figure 2.

Figure 1:
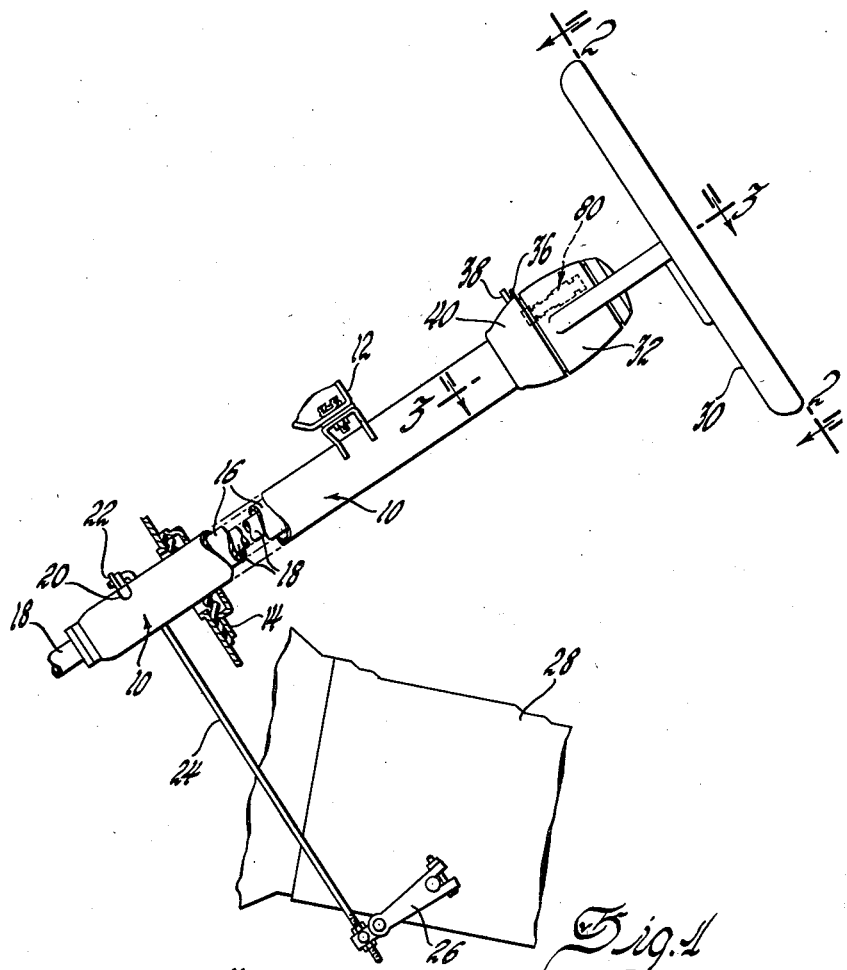
Figure 1 is an elevational view of a steering column with controls for the steering shaft and the transmission arranged according to the invention.

Figure 1 illustrates a steering column 10, supported by upper and lower brackets 12 and 14, which column rotatably supports a transmission control shaft 16 and a steering shaft 18 with the latter shaft housed inside control shaft 16. At the lower end of the steering column 10, a peripheral slot or opening 20 is furnished through which a side arm 22 extends. One end of the side arm 22 is suitably secured to an end of the transmission control shaft 16 and the opposite end is connected to a transmission link 24. This transmission link 24, in turn, is attached to an external lever 26 for a transmission 28. Maneuvering of the lever 26 changes the transmission settings in a well-known manner.

Figure 2:
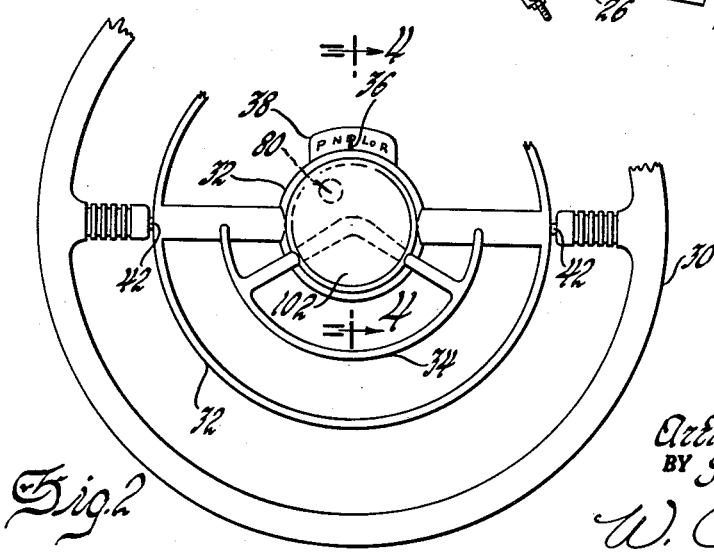
Figure 2 is a plan view of the steering wheel and a transmission control member.

At the upper end of the steering column 10, a steering member or wheel 30 is positioned, and as best seen in Figure 2, a horn ring 32 and a transmission control member, such as hemispherical selector ring 34, are disposed concentrically with the steering wheel 30. The selector ring 34 has coacting therewith a pointer 36 which lies opposite a transmission position indicator segment 38 attached to or made integral with a lower cover 40 fixed to the stationary column 10.

Referring to Figures 3 and 4, spokes 42 for the steering wheel 30 terminate in a ring and a support which together constitute a steering wheel hub, designated generally at 44. Hub 44 is press fitted or otherwise secured to the tapered upper end of the steering shaft 18 and retained in position axially by a lock nut 50 threadedly engaged to the end of the steering shaft. Downwardly from the hub 44, the steering shaft 18 is journaled by a bearing 52 through an insert 54 to the steering column 10.

Upwardly from the hub 44 of the steering wheel, a horn control mechanism 56 is positioned. This mechanism includes a cup-shaped member 58 of insulating material fixed radially and axially by a transfer sleeve 60 which is secured to the hub 44. Cup-shaped member 58 defines a chamber into which an annular contact ring 62 is disposed. Contact ring 62 has an inwardly extending arm 64 with an attached stem 66. Stem 66 extends inside the hollow steering shaft 18 and is connected through a conductor 68 to a horn (not shown). An insulator ring 69 is positioned on the stem 66 and biased against the end of the steering shaft 18 by a small coil spring 70. Contact ring 62 has a series of outwardly extending fingers 71 which are attached by screws 72 to and insulated from a cover flange 74. Cover flange 74, then, is connected to a hub 76 of the horn ring 32. Hub 76 is shrouded to provide a cover for the steering wheel hub 44 and spokes 42. Interposed between the cup-shaped member 58 and cover flange 74 is a conical spring 78. This spring is radially positioned by the fixed cup-shaped member 58 and, therefore, urges the horn cover flange 74 and attached contact ring 62 outwardly out of contact with the steering wheel hub 44. When the horn ring 32 is depressed, the conical spring is compressed and the contact ring 62 engages the hub 44 completing an electrical circuit from the horn blowing device and the conductor 68 through the contact ring 62, the steering wheel hub 44 and the steering shaft 18 to a ground, namely, the vehicle frame (not shown).

For interconnecting the selector ring 34 and the transmission control shaft 16 gearing 80, preferably of the planetary gear type, is utilized. This gearing comprises a pinion shaft 82 rotatably journaled by hub 44, which functions as a planet carrier, and a pair of planet pinions 84 and 86 affixed to shaft 82. Pinion 86 meshes with a sun gear 88 attached to a drive element 90. Drive element 90 is rotatably housed by transfer sleeve 60 and is connected to the hub of the selector ring 34. Pinion 84 meshes with a sun gear 92 journaled on a bearing sleeve 94. Bearing sleeve 94 is grounded to the steering column 10 and through a snap ring 95 prevents axial movement of the sun gear 92. Sun gear 92 is connected through a drive flange 96 and shoulder screws 98 to the transmission control shaft 16. Slots 100 are provided in the steering column 10 to permit rotation of the drive flange 96 and shoulder screws 98 and accordingly, the transmission control shaft 16. The pointer 36, as viewed in Figure 4, may be made integral with or secured to the flange 96. A button 102 is attached by spring fingers 104 (see Figure 4) to and encloses the drive element 90.

In operation of the planetary gearing 80, when the selector ring 34 is rotated from one transmission setting to another, as depicted on indicator segment 38, sun gear 88 drives pinion 86. As a result pinion shaft 82 and pinion 84 rotate sun gear 92, which rotates the transmission control shaft 16 through drive flange 96 and shoulder screws 98. In turn, shift lever 26 for the transmission is actuated through side arm 22 and link 24 reconditioning the transmission to the desired setting.

This operation does not interfere with the rotation of the steering wheel since the planetary gearing 80, with the steering wheel hub 44 as a planet carrier, rotates independently. With the transmission positioned in the desired setting and assuming that this setting is maintained by a suitable detent mechanism (not shown) in the transmission 28, sun gear 92 will be restrained against rotation until a sufficient force is applied to the selector ring 34. Assuming that pinions 84 and 86 and sun gears 88 and 92 are selected with the same numbers of teeth and that sun gear 92 is stationary, rotation of the steering wheel 30 and hence, the steering wheel hub 44 will carry the pinion shaft 82 with it. The pinions 84 and 86 will revolve both about the orbit defined by the hub 44 and their respective axes without inducing any drive force between the stationary sun gear 92 and sun gear 88. Therefore, it can be seen that the transmission control shaft 16 and the transmission selector ring 34 are intergeared through the steering wheel hub without interfering with the operation or positioning of either. In addition, the selector ring 34 can be moved either independently of or with the steering wheel 30, the limits of movement of the selector ring 34 being determined by the slots 100. As a consequence, the pointer 36 will always remain in its selected position until moved by the ring 34.

We claim:

1. In combination with a steering column, transmission control and steering shafts rotatably supported by the steering column, a transmission control member positionable in a plurality of transmission settings, a steering wheel including a hub portion secured to the steering shaft between an end of the steering shaft and the transmission control member, and planetary gearing means for drive connecting the transmission control shaft and the transmission control member through the steering wheel to permit independent movement of both the steering shaft and the transmission control shaft.

2. In combination with a steering column, transmission control and steering shafts rotatably supported by the steering column, the steering shaft being disposed within the transmission control shaft, a rotatably mounted transmission control member positionable in a plurality of transmission settings, a steering wheel including a hub portion secured to the steering shaft between an end of the steering column and the transmission control member, and planetary gearing means for interconnecting through the steering wheel the transmission control shaft and the transmission control member to permit independent movement of both the steering shaft and the transmission control shaft.

3. In combination with a steering column, transmission control and steering shafts rotatably supported by the steering column, the steering shaft being disposed within the transmission control shaft, a rotatably mounted transmission control member positionable in a plurality of transmission settings, a steering wheel including a hub portion secured to the steering shaft between an end of the steering column and the transmission control member, and planetary gearing drive connecting through the steering wheel the transmission control shaft and the transmission control member to permit independent rotation of both the steering shaft and the transmission control shaft.

4. In combination with a steering column, transmission control and steering shafts rotatably supported by the steering column, a transmission control member positionable in a plurality of transmission settings, a steering wheel including a hub portion secured to the steering shaft between an end of the steering shaft and the transmission control member, and planetary gearing for interconnecting through the steering wheel the transmission control shaft and the transmission control member to permit independent movement of both the steering shaft and the transmission control shaft, the planetary gearing comprising a first gear rotatable with the transmission control member, a second gear rotatable with the transmission control shaft, a pinion shaft journaled on the steering wheel and rotatable therewith, and a pinion attached to each end of the pinion shaft, one of the pinions engaging the first gear and the other of the pinions engaging the second gear.

5. In combination with a steering column, transmission control and steering shafts rotatably supported by the steering column, the steering shaft being disposed within the transmission control shaft, a rotatably mounted transmission control member positionable in a plurality of transmission settings, a steering wheel including a hub portion secured to the steering shaft between an end of the steering column and the transmission control member, and planetary gearing for interconnecting through the steering wheel the transmission control shaft and the transmission control member to permit independent movement of both the steering shaft and the transmission control shaft, the planetary gearing comprising a first gear rotatable with the transmission control member, a second gear rotatable with the transmission control shaft, a pinion shaft journaled on the steering wheel and rotatable therewith, and a pinion attached to each end of the pinion shaft, one of the pinions engaging the first gear and the other engaging the second gear.

6. In combination with a steering column, a transmission control shaft rotatably supported by the steering column, a steering shaft disposed within the transmission control shaft and rotatably supported by the steering column, a rotatably mounted transmission control member positionable in a plurality of transmission settings, a steering wheel including a hub portion secured to the steering shaft between an end of the steering column and the transmission control member, and planetary gearing for interconnecting through the steering wheel and the steering column the transmission control shaft and the transmission control member to permit independent movement of both the steering shaft and the transmission control shaft, the planetary gearing comprising a first externally toothed sun gear rotatable with the transmission control member, a second externally toothed sun gear rotatable with the transmission control shaft, a pinion shaft journaled to the steering wheel hub portion and rotatable therewith, and a pinion attached to each end of the pinion shaft, one of the pinions engaging the first sun gear and the other of the pinions engaging the second sun gear.

7. In combination with a steering column, a transsteering column, a steering shaft disposed within the transmission control shaft, a bearing interposed between the steering shaft and the steering column adjacent an end of the transmission control shaft for rotatably supporting the steering shaft, a rotatably mounted transmission control member positionable in a plurality of transmission settings, a steering wheel including a hub portion secured to the steering shaft between an end of the steering column and the transmission control member, and planetary gearing for interconnecting through the steering wheel and the steering column the transmission control shaft and the transmission control member to permit independent movement of both the steering shaft and the transmission control shaft, the planetary gearing comprising a first gear rotatable with the transmission control member, a second gear adjacent the bearing and positioned on the opposite side of the steering wheel hub portion from the first gear, a drive connection between the transmission control shaft and the second gear extending around the bearing and through the steering column, a pinion shaft journaled to the steering wheel hub portion and rotatable therewith, and a pinion attached to each end of the pinion shaft, one of the pinions engaging the first gear and the other of the pinions engaging the second gear.

References Cited in the file of this patent

UNITED STATES PATENTS

| | | |
|---|---|---|
| 1,305,616 | Norris | June 3, 1919 |
| 1,430,229 | Heath | Sept. 26, 1922 |
| 1,992,419 | Girardi | Feb. 26, 1935 |
| 2,662,419 | Lincoln et al. | Dec. 15, 1953 |

FOREIGN PATENTS

| | | |
|---|---|---|
| 504,294 | France | Apr. 10, 1920 |
| 1,126,760 | France | July 30, 1956 |

UNITED STATES PATENT OFFICE
CERTIFICATE OF CORRECTION

Patent No. 2,943,510                         July 5, 1960

Arthur F. Bohnhoff et al.

It is hereby certified that error appears in the printed specification of the above numbered patent requiring correction and that the said Letters Patent should read as corrected below.

Column 4, line 65, after "trans-" insert -- mission control shaft rotatably supported within the --.

Signed and sealed this 31st day of January 1961.

(SEAL)
Attest:
KARL H. AXLINE
Attesting Officer

ROBERT C. WATSON
Commissioner of Patents